United States Patent [19]

Comerford et al.

[11] 4,184,381
[45] Jan. 22, 1980

[54] SWITCH AND CABLE ACTUATOR

[75] Inventors: John Comerford, Glendale Heights; Richard L. Lauritsen, Hoffman Estates, both of Ill.

[73] Assignee: The Singer Company, New York, N.Y.

[21] Appl. No.: 926,929

[22] Filed: Jul. 21, 1978

[51] Int. Cl.² ............................................. F16H 37/00
[52] U.S. Cl. ................................................ 74/471 XY
[58] Field of Search ............... 74/741 R, 741 XY, 503

[56] References Cited
U.S. PATENT DOCUMENTS

| | | | |
|---|---|---|---|
| 3,517,568 | 6/1970 | Payerle | 74/471 XY |
| 4,041,976 | 8/1977 | Brownell | 74/471 XY |
| 4,124,787 | 11/1978 | Aamoth et al. | 74/471 XY |

Primary Examiner—Patrick D. Lawson

[57] ABSTRACT

The actuating knob is biased to a center (off) position and can be actuated in opposite directions in each of two planes. Actuation in one plane serves to actuate either of two switches. Actuation in the other plane will actuate either of the same two switches but prior to actuating the switch will mechanically actuate a transmission through a Bowden cable. The cable wire is connected to the free end of each of two levers pivoted on the mounting bracket. Each lever is engaged by a pin protruding from a disc carried on the end of a cylinder rockably mounted in the switch casing and actuated by the knob. When the cylinder is moved from its normal mid position, one of the pins lifts the lever (the other lever has to go along) to lift the cable wire.

10 Claims, 7 Drawing Figures

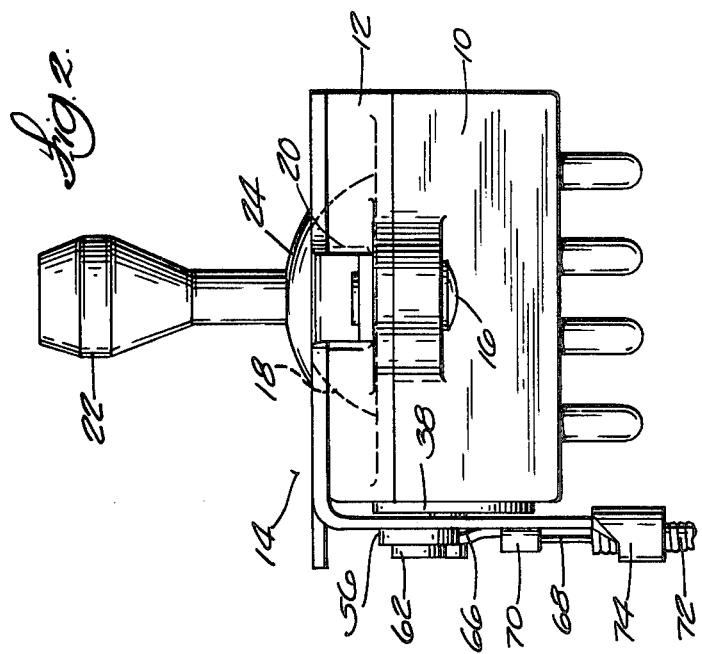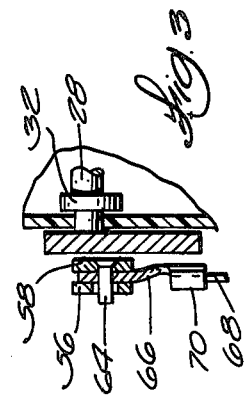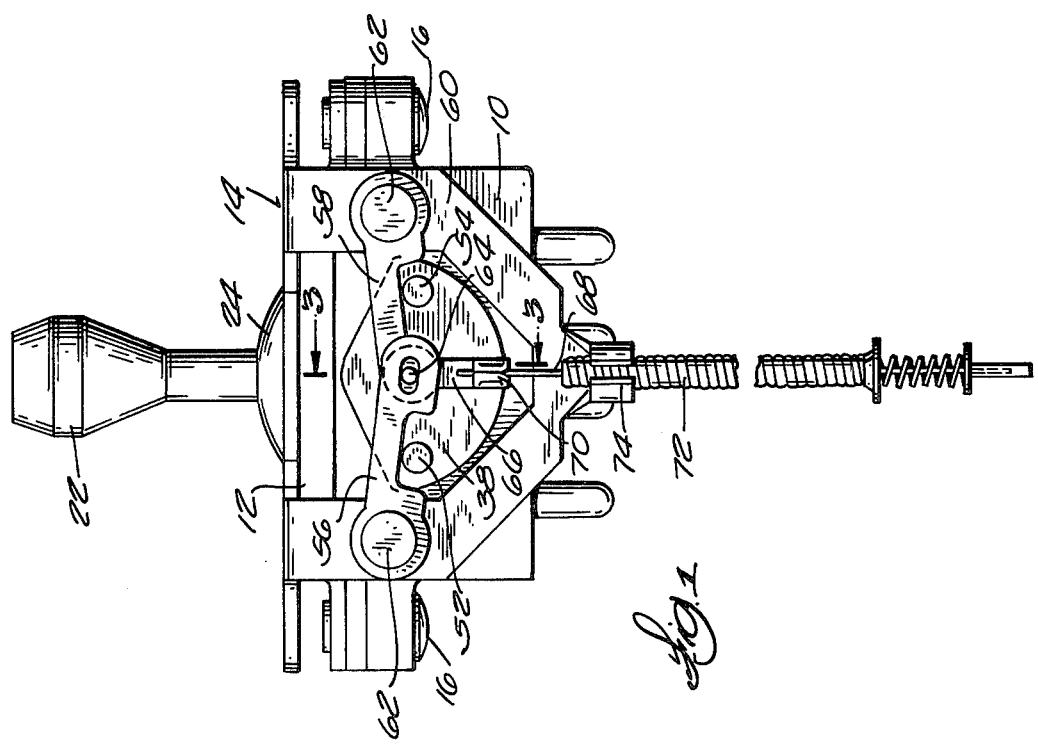

SWITCH AND CABLE ACTUATOR

BACKGROUND OF THE INVENTION

The present control is designed for controlling an automatic power seat. In the past, the shifting of the transmission (for actuation "up" and "down") has entailed use of solenoids and attendant circuitry.

SUMMARY OF THE INVENTION

The primary object of this invention is to control energization of a motor and to provide mechanical actuation of a transmission in timed relation to the switch actuation. A furthur object is to have the capability of providing various cable travel distances and to provide variations in the timing of the sequence. By selection of the geometric parameters operating force, travel, timing and the like can be tailored to the requirements.

BRIEF DESCRIPTION OF THE DRAWINGS

FIG. 1 is a front elevation of the mechanism.
FIG. 2 is an elevation from the right in FIG. 1.
FIG. 3 is an enlarged detail on line 3—3 in FIG. 1.

DESCRIPTION OF THE PREFERRED EMBODIMENT

Figure 4:
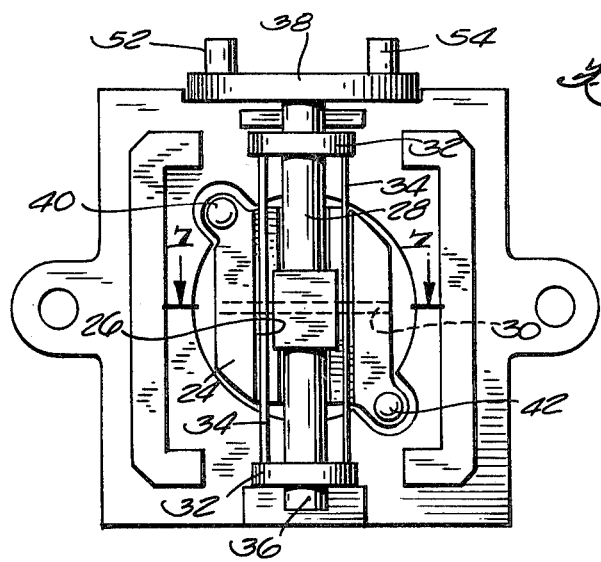
FIG. 4 is a plan view of the underside of the cover and actuator subassembly.
Figure 6:
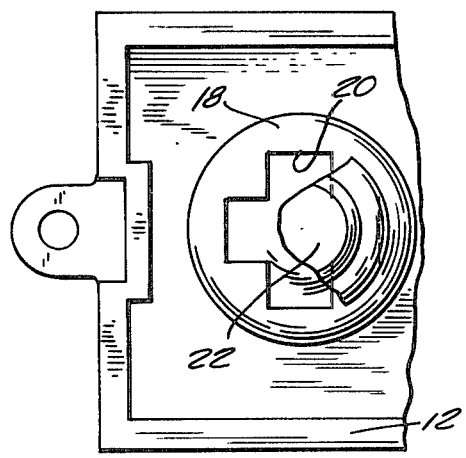
FIG. 6 is a top plan view with parts broken away to show the means restraining the actuator to movement in two planes at right angles.
Figure 5:
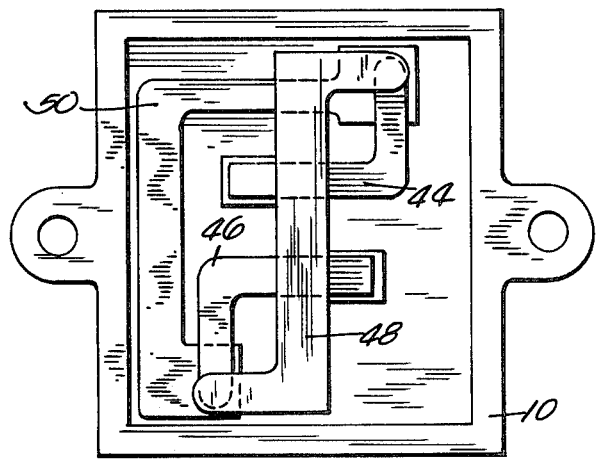
FIG. 5 is a plan view of the switch arrangement in the lower casing.
Figure 7:
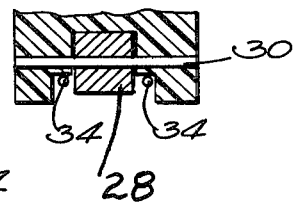
FIG. 7 is a detailed section showing the pivot arrangement of the shaft.

The control is made up of three subassemblies comprising case 10, cover 12 and the bracket 14. The three are rivetted together by means of two rivets 16, 16. The top surface of the cover is recessed and has a central dome portion 18 having a cross shaped cutout 20 through which the shaft of actuating knob 22 projects and is restrained to motion in two planes at 90°. The knob shaft is fixed in a switch actuating member 24 having a hemispheric upper surface received in the underside of the dome 18. The underside of the switch actuating member has diametric groove 26 which receives the shaft 28. The central portion of shaft 28 has a square cross section and is connected to the switch actuating member 24 by means of pin 30 which journals the switch actuating member for rocking motion about the axis of pin 30. Circular flanges 32 near each end of shaft 28 cooperate with the inside of the cover wall to axially fix the shaft 28. Spring wires 34 interconnect the flanges on each side of the shaft 28 and pass over the flat surface on the underside of the switch actuating member to serve to center the switch actuating member (and therefore the knob) in its rocking motion about the axis of pin 30. If the switch actuating member is rocked about the pin the spring wires 34 are stressed and on release of the knob the restoring force exerted by the spring wires will return the knob to the center position. One end of the shaft 28 has a protruding stub 36 which is received with a slip fit in a cooperating socket in the casing to journal the shaft. The other end of the shaft projects through a cooperating notch in the casing wall and carries disc 38 for rotation with the shaft 28.

The underside of the switch actuating member carries two pads 40, 42 at opposed corners. Pad 40 is adapted to overlies and actuate switch blade 44 while the pad 42 overlies and actuates switch blade 46. Each of the blades 44 and 46 is biased upwardly into contact with the common buss 48 which is connected to ground. When either blade is moved downwardly it will engage the other buss 50 which is connected to the positive side of the battery in an automotive system. Either pad can be actuated to engage the positive buss either by rocking motion about the axis of pivot pin 30 or by rocking motion about the axis of shaft 28. Therefore, the motor is energized when the knob is moved in either of the two transverse planes to which it is constrained. When the knob is moved in the plane transverse at the axis of shaft 28 to rock shaft 28 and disc 38 it will also shift the transmission connecting the motor to the seat drive. This actuation is accomplished by taking motion off of the disc 38 mounted on the outboard end of shaft 28.

The disc is provided with two projecting pins 52, 54 which respectively underlie arms 56, 58 pivotly mounted on the bracket portion 60 by rivets 62. The free end of each lever is provided with an elongated slot snugly receiving (in the vertical sense) pin 64 projecting to either side of the flat end 66 on the connector crimped on the Bowden cable wire 68 at 70. Bowden cable shield 72 is crimped to the bracket at 74. Levers 56, 58 are connected to the cable wire pin 64 and the wire and shield are crimped prior to assembly of the bracket to the casing and cover. When brought together for final assembly, pins 52, 54 are placed under levers 56, 58. When the wire is pulled down, as it will be in use through a bias, it will pull the ends of the levers 56, 58 down until they rest equally on pins 52, 54 thereby forcing the disc 38 and hence shaft 28 to the center position. When the knob is actuated to rotate shaft 28 and therefore disc 38 one of the two pins 52, 54 will engage a lever arm and lift upwardly which will pull the cable wire upwardly and, of course, will force the other arm to follow along. The distance the pins 52, 54 are from the pivot point of the levers 56, 58 determines the motion multiplying effect obtained with this arrangement and therefore will determine the amount of lift imparted to the cable.

When the actuating knob is moved about the axis of pivot pin 30, it will actuate either of the two switches to drive the motor in forward or reverse. When the knob is actuated in the transverse plane to rock the shaft 28 and disc 38, it will actuate the motor in either forward or reverse by actuating either of the same two switches but this motion is also utilized to shift the transmission before actuating the switch. Therefore, instead of moving the car seat forward and rearward, the motor will move the car seat up and down.

The actuating knob is gimbal mounted by reason of its pivotal action about either of two intersecting axis and is constrained to movement (from the center position) in two transverse planes perpendicular to said axis. Motion in one of the two planes is picked off to impart a mechanical control function in addition to the switching function obtained when the knob is operated in either plane. The mechanical motion precedes the switch actuation.

We claim:
1. A control device comprising,
  a casing, an actuating knob pivotally mounted in the casing for movement in a plane, means biasing the knob to a center position in its available travel, a member moveable between a normal position and an actuated position, and means connected to said member and responsive to movement of said knob in said plane in either direction from said center position to move said member to its actuated position.

2. A control device according to claim 1 including, a pair of switches mounted in said casing, means actuated by said knob for operating one of said switches when the knob is moved in one direction in said plane from said center position and for operating the other of said switches when the knob is moved in the other direction from said center position.

3. A device according to claim 2 including, means permitting and constraining the knob to movement in a second plane transverse the first plane, said switch operating means being operative to operate said switches when the knob is moved from the center position in either direction.

4. A device according to claim 3 including, means biasing the knob to its center position in said second plane.

5. A control device comprising a casing, an actuating knob mounted in the casing on a gimbal connection providing movement about two pivot axis intersecting at substantially 90°, means constraining the knob to movement in two intersecting planes coinciding with the pivot axis, means biasing the knob to a center position at the intersection of the planes, a pair of switches, means actuated by the knob to operate one of the switches when the knob is moved from the center position in a first direction in one plane or in a first direction in the other plane, and means actuated by the knob to operate the other switch when the knob is moved from the center position in an opposite direction in said one plane or in an opposite direction in said other plane.

6. A device according to claim 5 including a control member, and means responsive to movement of the knob from the center position in one plane in either direction to impart movement to the control member.

7. A control device comprising, a casing, a switch actuating member mounted in the casing by a gimbal connection providing movement of the member about two axis intersecting at 90°, an actuating knob connected to the member and projecting from the casing, means constraining the knob to motion in two planes perpendicular to said axis, means biasing the knob to a center position at the intersection of said planes, an operating member mounted for linear movement along a line intersecting one of said axis, a pair of levers each of which is mounted on a pivot parallel to said one of said axis with the pivots being on opposite sides of and equidistant from said line, the free ends of said levers projecting towards the line and being connected to said operating member, a rocking member moveable with said actuating member only when the actuating member moves about said one of said axis, a pair of pins on said rocking member equally spaced from the rocking axis of the rocking member and each engaging one of said levers to actuate one of the levers as the rocking member rocks.

8. A device according to claim 7 in which the connection between the operating member and each lever permits limited relative motion to allow the lever end to move on an arcuate path while the operating member moves on a linear path.

9. According to claim 7 in which the rocking member is fixed on the end of a shaft the axis of which is said one of said axis.

10. According to claim 9 in which said shaft is connected to the switch actuating member by a pin the axis of which is the other of said axis.

* * * * *